J. W. ASKIE.
Stop-Motion for Machinery.

No. 163,624. Patented May 25, 1875.

Witnesses
E. H. Ober.
Frank W. Parker

John W. Askie,
Inventor,
By his Attys.,
Henry W. Williams & Co.

UNITED STATES PATENT OFFICE.

JOHN W. ASKIE, OF MELROSE, MASSACHUSETTS.

IMPROVEMENT IN STOP-MOTIONS FOR MACHINERY.

Specification forming part of Letters Patent No. 163,624, dated May 25, 1875; application filed February 20, 1875.

*To all whom it may concern:*

Be it known that I, JOHN W. ASKIE, of Melrose, in the county of Middlesex and State of Massachusetts, have invented a new and valuable Improvement in Stop-Motions for Sewing-Machines, &c., of which the following, when taken in connection with the accompanying drawings, is a full, clear, and exact specification.

This invention is intended to be applied particularly to sewing-machines, but may be used in any other connection where it will be of service. It is especially useful when applied to sewing-machines run by steam-power.

It is quite common, in operating sewing-machines run by steam-power, to stop a machine suddenly, thus badly jarring it, and even, in some instances, wrenching the fly-wheel from the shaft.

In my invention I apply the stopping device not to the fly-wheel, but to the shaft, and, by means of the arrangement below described, brake it up somewhat before bringing it to a full stop. Thus no damage is done to the machinery.

Figure 1:
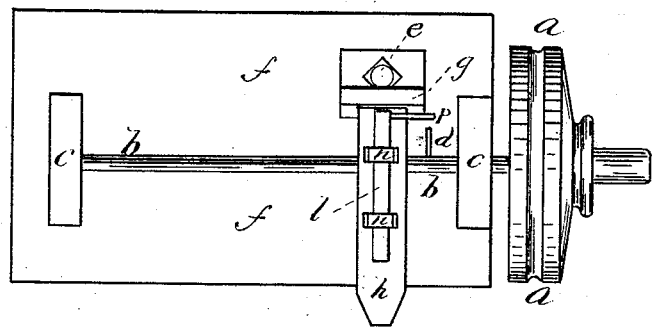
Figure 2:
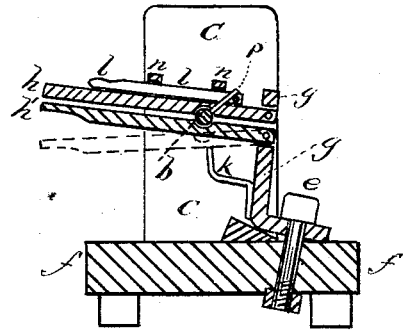

In the accompanying drawing, Figure 1 is a plan view of my device, and Fig. 2 is a vertical section.

Similar letters of reference indicate corresponding parts.

$a$ represents a fly-wheel fixed upon the shaft $b$, which has its bearings in the standards $c\ c$. $d$ is a projecting rod set in the shaft $b$. Screwed down by means of the bolt $e$ to the base $f$ is an upright piece, $g$, in which are placed, by means of pins or hinges, two levers, $h\ h'$, one above and the other below the shaft $b$. The lever $h$ rests upon the shaft $b$, and the lever $h'$ lies upon the support $k$ below the shaft $b$. $l$ is a slide running in guides $n\ n$ upon the upper side of the lever $h$. Projecting horizontally and in a direction parallel with the shaft $b$ is a rod, $p$.

In operating the invention, when the machine is to be stopped, the levers $h\ h'$ are pressed against the shaft $b$, as in Fig. 2, and when the speed of the shaft $b$ is sufficiently diminished, the slide $l$ is moved forward, and the rod $d$ strikes the rod $p$, and the machine is instantly stopped.

It will be seen that the speed is checked before it is entirely stopped, in order to prevent jar and breakage.

I do not confine myself to the exact shapes of the parts $k\ g\ e$, as any equivalents may be used.

The levers $h\ h'$ and the slide $l$ may be operated by suitable machinery or convenient devices, if thought necessary, as in the case of heavy shafting, and any projection of any shape or kind may be substituted for the rod $d$.

Having thus fully described my invention, what I claim, and desire to secure by Letters Patent, is—

In combination with the shaft $b$, provided with the rod or projection $d$, the levers $h\ h'$ and slide $l$, provided with the rod $p$, substantially as and for the purpose herein specified.

JOHN W. ASKIE.

Witnesses:
HENRY W. WILLIAMS,
E. H. OBER.